(12) United States Patent
Faris

(10) Patent No.: US 7,197,204 B2
(45) Date of Patent: *Mar. 27, 2007

(54) APPLICATIONS OF LIGHT MOVABLE LIQUID CRYSTAL

(75) Inventor: Sadeg M. Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/941,294

(22) Filed: Sep. 15, 2004

(65) Prior Publication Data

US 2005/0105158 A1    May 19, 2005

Related U.S. Application Data

(60) Provisional application No. 60/503,083, filed on Sep. 15, 2003.

(51) Int. Cl.
*G02B 6/26* (2006.01)
*G02B 6/42* (2006.01)

(52) U.S. Cl. .................. 385/18; 385/16; 359/872; 359/877; 349/62

(58) Field of Classification Search .................. 385/16, 385/18; 359/872, 877; 349/62
See application file for complete search history.

(56) References Cited

U.S. PATENT DOCUMENTS 4,626,073 A * 12/1986 Amstutz et al. ............ 349/155
5,641,836 A    6/1997 Carter et al. ................ 525/152
6,075,239 A * 6/2000 Aksyuk et al. ............. 250/229
6,312,770 B1 * 11/2001 Sage et al. .................. 428/1.1
6,526,198 B1    2/2003 Wu et al. ...................... 385/18
6,778,722 B1 * 8/2004 Klocek et al. ................ 385/16
7,116,857 B2 * 10/2006 Faris ............................ 385/18
2003/0098945 A1 * 5/2003 Sugimoto et al. ........... 349/172
2004/0057002 A1 * 3/2004 Nishiyama et al. ......... 349/129

OTHER PUBLICATIONS

PCT ISA, PCT/US2004/30160 Mar. 31, 2005.
Cviklinski et al., Eur. Phys. J. E. 9, 427-434 (2002), "UV isomerisation in nematic elastomers sa a route to photo-mechanical transducer" Jan. 2003.
Jamieson, New Scientist Mar. 22, 2003, 18, "Crystal swims like a fish to escape from laser light" Mar. 2003.
Finkelmann et al., Phys. Rev. Let., vol. 87, No. 1, pp. 015501-1 through 015501-4, "A New Opto-mechanical Effect in Solids" Jul. 2001.
Hogan et al., Phys. Rev. E. vol. 65, 041720-1 through 041720-10, " uv manipulation of order and macroscopic shape in nematic elastomers" Apr. 2002.

* cited by examiner

*Primary Examiner*—Sung Pak
*Assistant Examiner*—Daniel Petkovsek
(74) *Attorney, Agent, or Firm*—Ralph J. Crispino, Esq.

(57) ABSTRACT

Practical applications of a class of nematic elastomer which has light avoidance characteristics are disclosed. Such practical applications include a switching device, a load carrying device and programmable mask. The use of different light sources, including the use of an autonomous device are further disclosed.

19 Claims, 9 Drawing Sheets

APPLICATIONS OF LIGHT MOVABLE LIQUID CRYSTAL

CROSS-REFERENCE TO RELATED APPLICATIONS

This application claims the benefit under 35 U.S.C. § 119(e) of U.S. Provisional Application No. 60/503,083 filed on Sep. 15, 2003 entitled "Applications of Light Movable Liquid Crystal," which is herein incorporated by reference.

TECHNICAL FIELD

The present invention relates to light movable liquid crystal, and more particularly to applications of light movable liquid crystal.

BACKGROUND OF THE INVENTION

Certain nematic elastomers have optomechanical capabilities. It has been shown that certain nematic elastomers have the property of being able to change their shape by up to 400% in a relatively narrow temperature range. Further, it has been demonstrated that if the nematic order is suppressed, certain elastomers demonstrate mechanical responses in response to optical signal application on the elastomer.

As disclosed in the Physical Review Letters by Finkelmann and Nishikawa in their article "A New Opto-Mechanical Effect in Solids," *Physical Review Letters*, Vol. 87, Number 1 (Jul. 2, 2001), which is herein fully incorporated by reference. They demonstrate optomechanical effect on photoisomerizable molecular rods which absorb light when illumination occurs on polarization along the polarization direction. At present, the only disclosure of movement of such materials lateral displacement within a body of fluid.

Finkelmann et al. note that the order parameter, back reaction and other related dynamic parameters may determine the rate of photoisomerization depending on the polarization of the rods in the nematic elastomer, Potentially, the discovery may result in a rubber-like liquid crystal which changes shape when placed in a beam of light, the crystal seems to swim away from the point of light impingement. The molecules in the liquid crystal line up in one direction and in the electric field of a laser the rods compress the surface of the material.

Finkelmann et al. have shown that when an azo dye is applied to the nematic elastomer the molecules in the nematic elastomer tends to line up in one direction. When a nematic liquid crystal is applied an azo dye, the dye molecules "fold up" when they absorb light.

Referring to FIG. 1, there is shown a schematic diagram of a nematic liquid crystal with an azo dye applied. A light of wavelength λ is incident on liquid crystal 10 in FIG. 1(*a*). Referring to FIG. 1(*b*), the dye molecules, in reaction to the incident light applied on liquid crystal 10, "fold up." Referring to FIG. 1(*c*), the dye molecules enable the liquid crystal 10 to speed up and avoid the light while losing the contraction. The liquid crystal 10 speeds across a direction 15.

The nematic elastomer additionally has the capability of accelerating motion proportional to the intensity of the light.

Although the discovery of the light avoiding properties of the particular liquid crystal has been surprising, there remains a need for practical applications of such light or laser movable liquid crystal ("LMLC").

The LMLC is an elastomer liquid crystal that moves in response to an illumination that moves in response to a laser movement or light source. The LMLC is on the order of micrometers. The LMLC may be formed in different shapes, such as rectangular, elliptical or longitudinal.

SUMMARY OF THE INVENTION

The above-described problems and deficiencies are solved by the present invention. Generally the invention provides:

In one aspect, the invention is a switching device actuatable with a light source for transmitting an optical signal therethrough, said switching device comprising: a light movable liquid crystal ("LMLC") positionable between a first position and a second position, wherein said LMLC is configured for mechanical actuation upon activation with said light source.

In another aspect, the invention is a switching device actuatable with a light source for transmitting an optical signal therethrough, said switch device comprising: a light movable liquid crystal ("LMLC") rotatable between a first position and a second position, wherein said LMLC is configured for mechanical rotation upon activation with said light source at an angular moment.

In another aspect, the invention is a semiconductor fabrication mask for fabricating a predetermined pattern on a wafer, said mask comprising: a plurality of LMLC arranged in a predetermined array, wherein each LMLC is positioned between a first position and a second position upon activation with a light source.

In another aspect, the invention is a load carrying device comprising: an LMLC configured for carrying a load, wherein said LMLC transports said load upon activation by a light source.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF THE FIGURES

Figure 1:
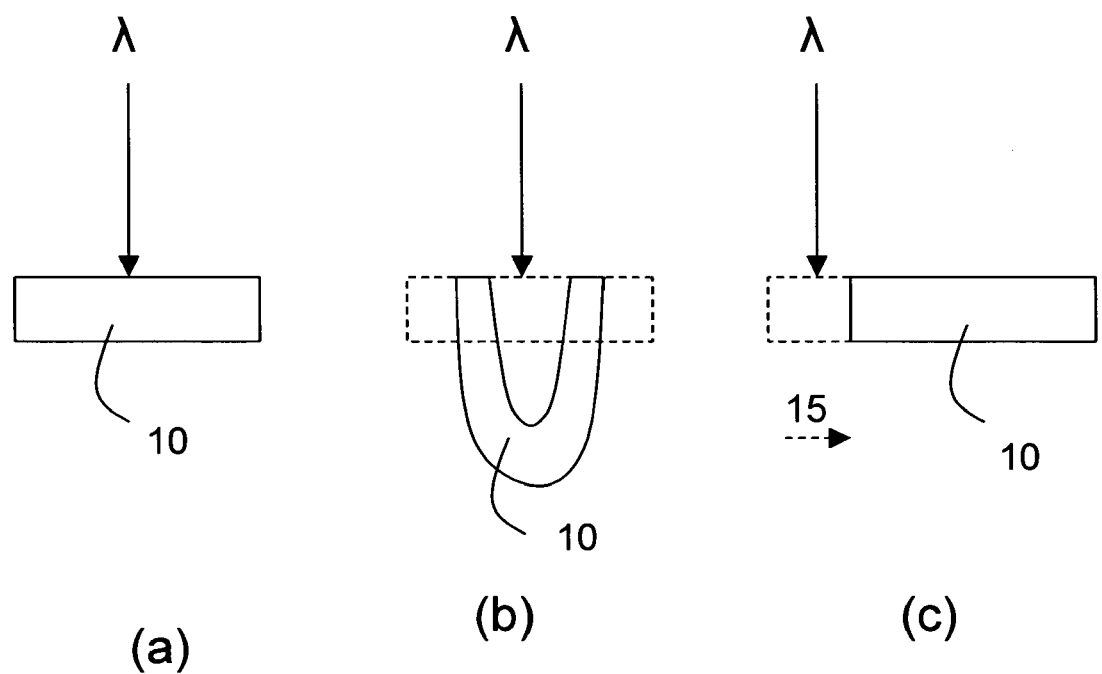
FIG. 1 is a schematic diagram of the operation of a class of nematic elastomer with light avoidance characteristics.
Figure 2:
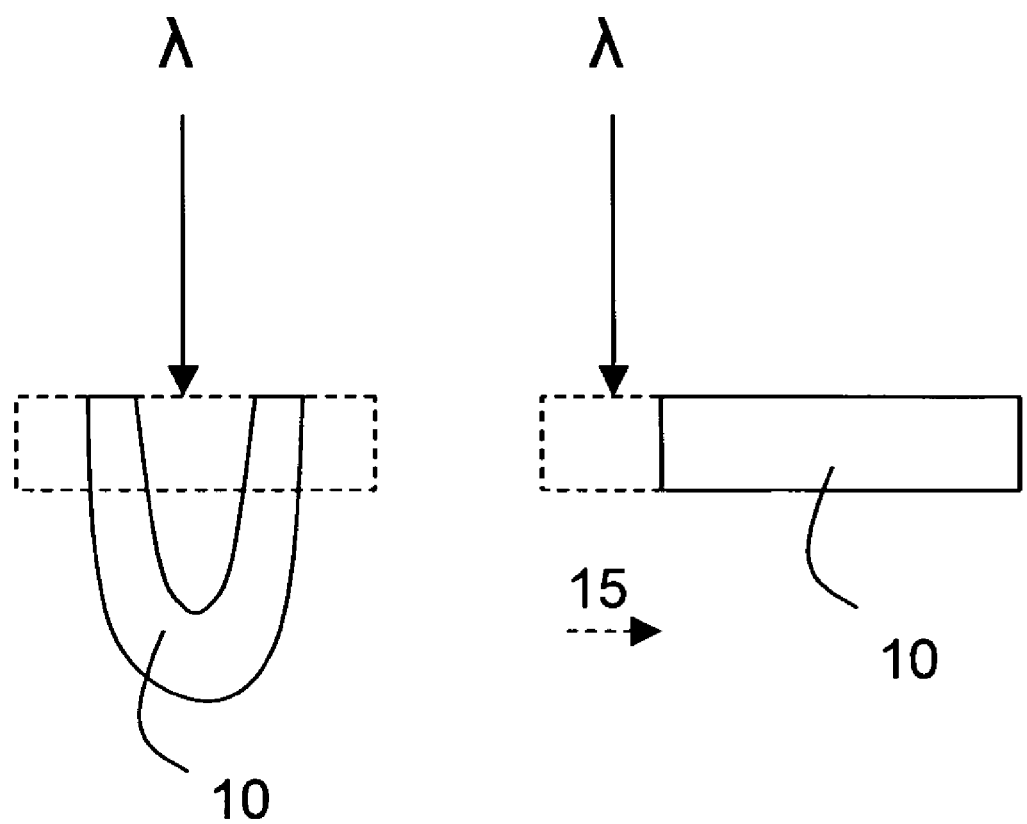
FIG. 2 is a schematic diagram of a light movable liquid crystal in accordance with the principles of the present invention.

To review, referring to FIG. 2, a light movable liquid crystal ("LMLC") is a nematic elastomer which has light avoidance characteristics which enable movement in a viscous fluid to avoid the light. In one embodiment, the LMLC 10 is moved between a first position and a second position (as illustrated by the dotted lines) in a direction 15.

Figure 3:
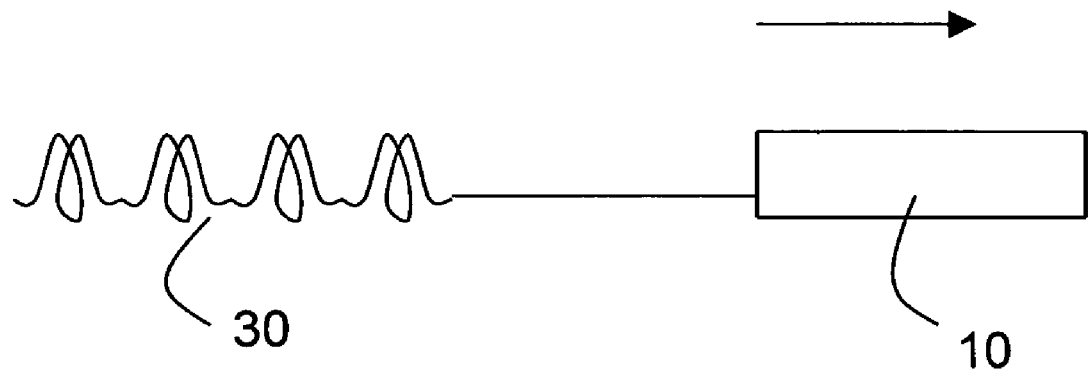
FIG. 3 is a schematic diagram of a LMLC configured as a load carrying device in accordance with the principles of the present invention.

Various optical switches and switching devices may be formed by utilizing the unique properties of the LMLC. Referring to FIG. 3, there is shown a LMLC optical switch in accordance with the principles of the invention which takes advantage of the optomechanical switch.

Optomechanical switches offer many advantages over electro-optical switches. Typically, optomechanical switches involves physical motion of some optical elements. Electrooptic switches, on the other hand, employ a change of refractive index to perform optical switching. The change of refractive index is typically accomplished by electro-optic or thermo-optic effects.

Generally optomechanical switches feature lower insertion loss, and lower crosstalk and higher isolation between the ON and OFF states. The switches of the present invention can also be made bidirectional further realizing savings on valuable chip real estate. Optomechanical switches, unlike electrooptic switches, are also independent of optical wavelengths, polarization and data modulation format. The crosstalk of electro-optic waveguide switches is limited to a range above −30 dB, and can often be in the range of −10 to −15 dB.

An optomechanical switch can be implemented either in free space, in fibers or in waveguides. An optomechanical free space switch is disclosed in the invention.

The movement from a first position and a second position upon application of light, as shown in FIG. 2, can be used to create other types of practical applications. upon application of light. This movement can be used to create a flip-flop for phototransistor devices. Other applications of this movement include reflectors, polarizers, filters, phase shifters, plungers, pistons, oscillators, tuners, choppers or scanners. For example, as a reflectable device, a plurality of LMLCs may be arrayed to form a reflective liquid crystal device, e-paper or switchable window.

Figure 4:
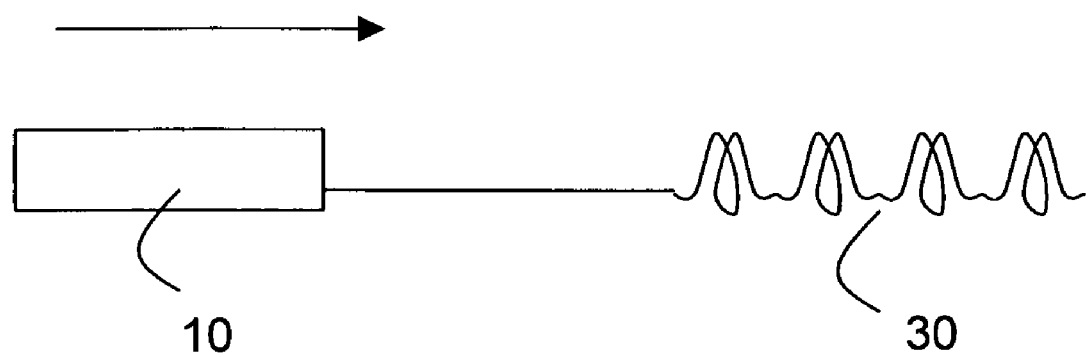
FIG. 4 is a schematic diagram of a LMLC configured as a load carrying device in accordance with the principles of the present invention.
Figure 5:
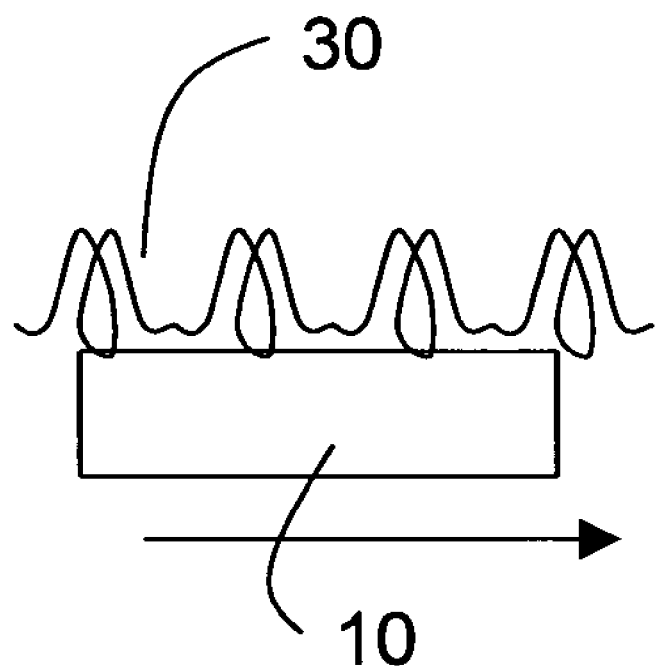
FIG. 5 is a schematic diagram of a LMLC configured as a load carrying device in accordance with the principles of the present invention.

Another application of the LMLC is as a load-carrying device. Referring to FIG. 3, the LMLC 10 is used to pull a load 30, for example, a strand of molecules (e.g. DNA). Referring to FIG. 4, the LMLC 10 may be used to push a load 30. Referring now to FIG. 5, an LMLC 10 may be used as a "raft" to carry a load 30 such as molecules or a nano or micro scale structure. Although not illustrated in the figures, the load may be attached to the underside of the LMLC to allow exposure to the light source. Alternatively, the LMLC may include a cargo area to support a load, leaving the light activated portions of the LMLC exposed.

Figure 6:
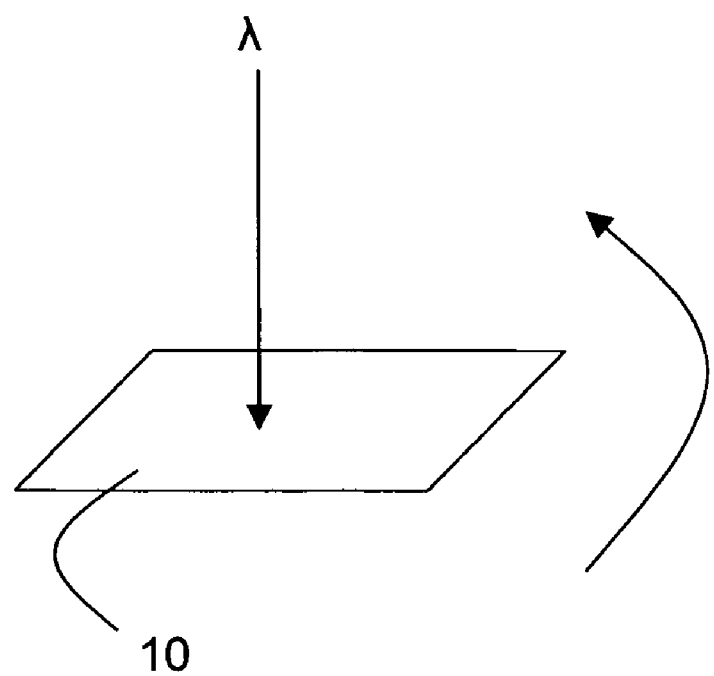
FIG. 6 is a schematic diagram of a LMLC configured for rotatable actuation in accordance with the principles of the present invention.

In another embodiment, and referring to FIG. 6, a rotational movement of the LMLC may be accomplished by an appropriate incident light source. For example, the light source or laser may direct the beam of light used to initiate movement at an angle to the LMLC.

In another embodiment, the range and path of motion may be predetermined by a suitable channel, track, guide wire, or other guidance system. The guidance system may be built of etched substrate on a viscous fluid. Conventional etching techniques can be used.

In still further embodiments, any desired path or range of motion may be determined by a suitable light or laser scanning device.

Figure 7:
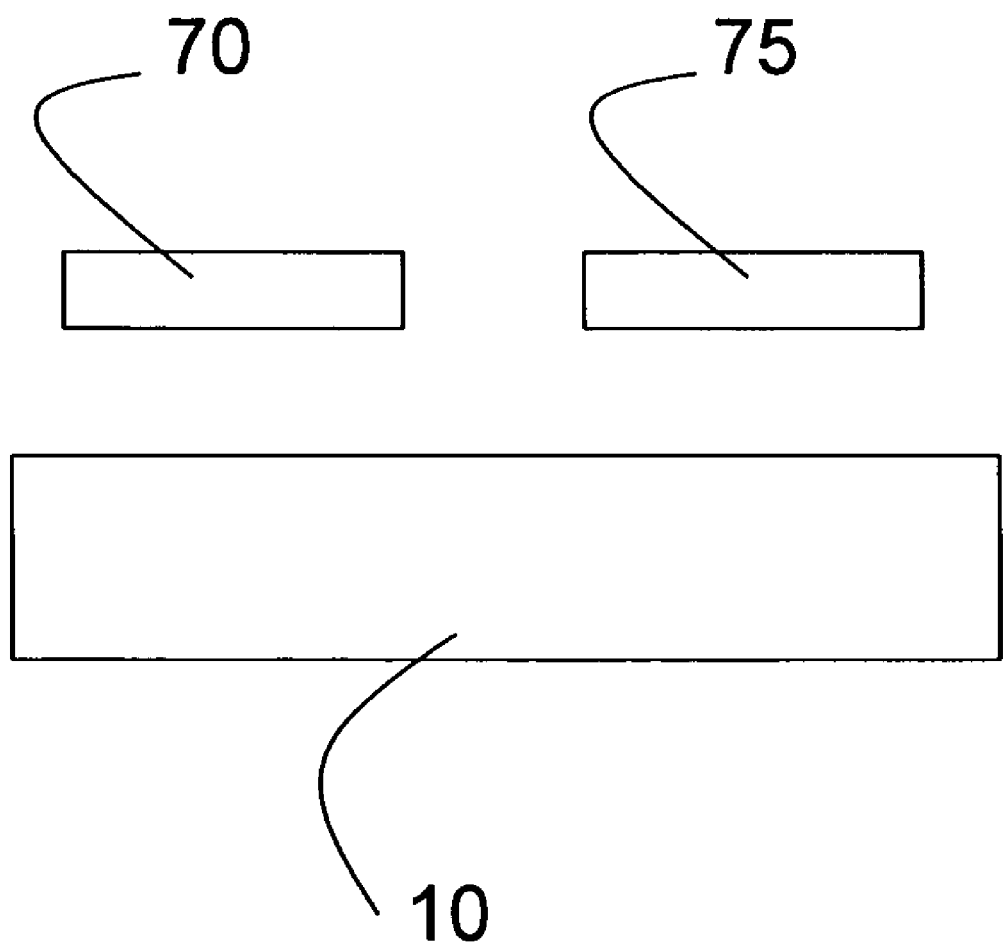
FIG. 7 is a schematic diagram of a LMLC configured as an autonomous device in accordance with the principles of the present invention.
Figure 8:
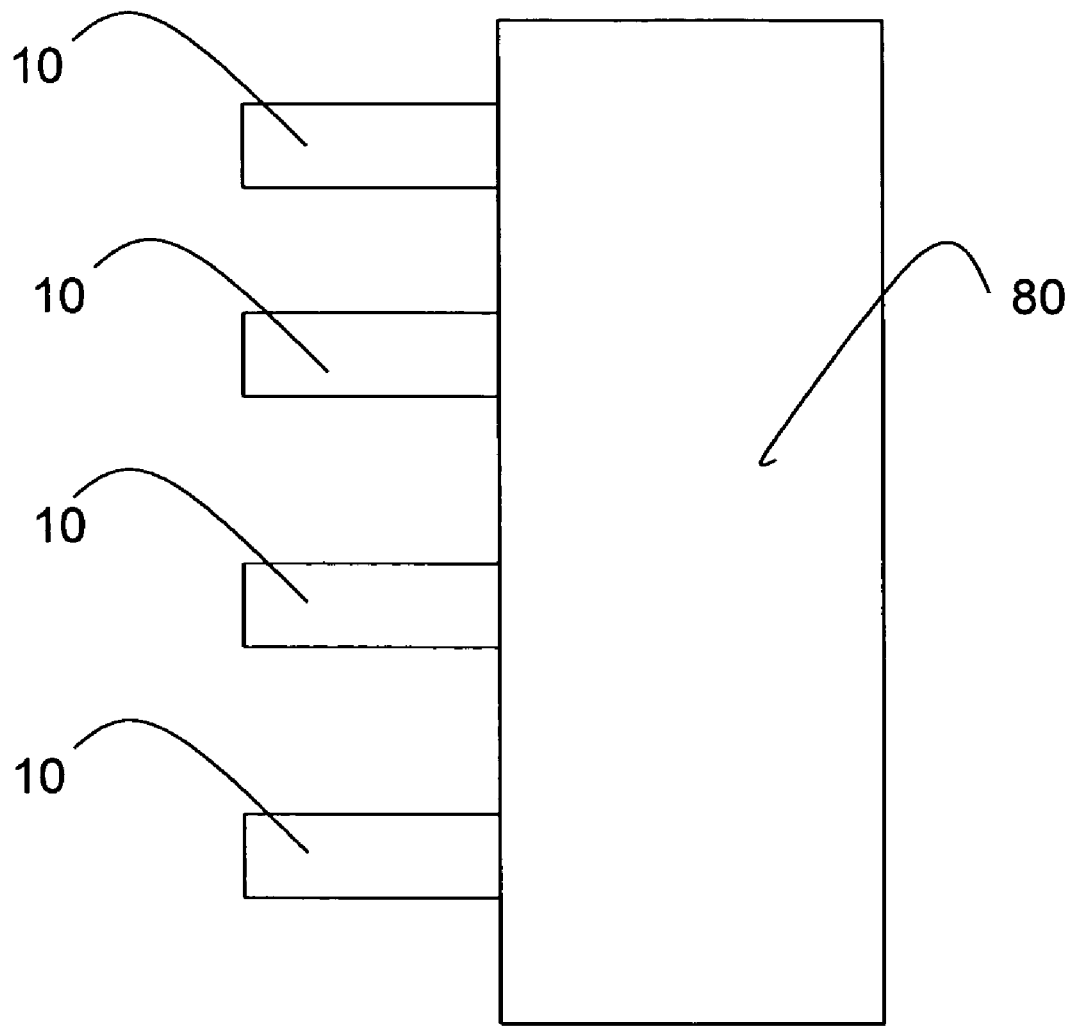
FIG. 8 is a schematic diagram of a plurality of LMLC configured as a load carrying device in accordance with the principles of the present invention.

In another application an autonomous device may be formed, referring to FIG. 7, the autonomous device may include its own light source 70. The light source may be fashioned conventionally on a substrate. Conventional light sources can include eximer lasers, free electron lasers or dye lasers. Thee light source is electrically coupled to a power source 75. The power source may be a metal air or electrochemical battery or fuel cell which can provide a mobile autonomous source of power. Accordingly, a self-propelled and a self-powered LMLC may be formed. The self-powered self-controlled LMLC may include, for example, radio frequency antennas (not shown) for accepting control signals, sensors for determining information about characteristics of a subject, loads to carry, or even may be used in a drug release environment. In a still further embodiment, and referring to FIG. 8, a plurality of LMLCs may be arranged in parallel to combine strengths to pull a load.

Many applications may be derived from the above-described generic applications of LMLC. Various features may also be imparted. For example, for continuous movement, a laser scanning may be used. Further, various beam steering devices, including those invented by Reveo, may be used.

In another embodiment, the LMLCs may be arranged to move in circular or elliptical fashion, referring back to FIG. 6. Based on the angle of incidence of the laser beam, LMLC will gain angular momentum, causing circular or elliptical motion.

Figure 9:
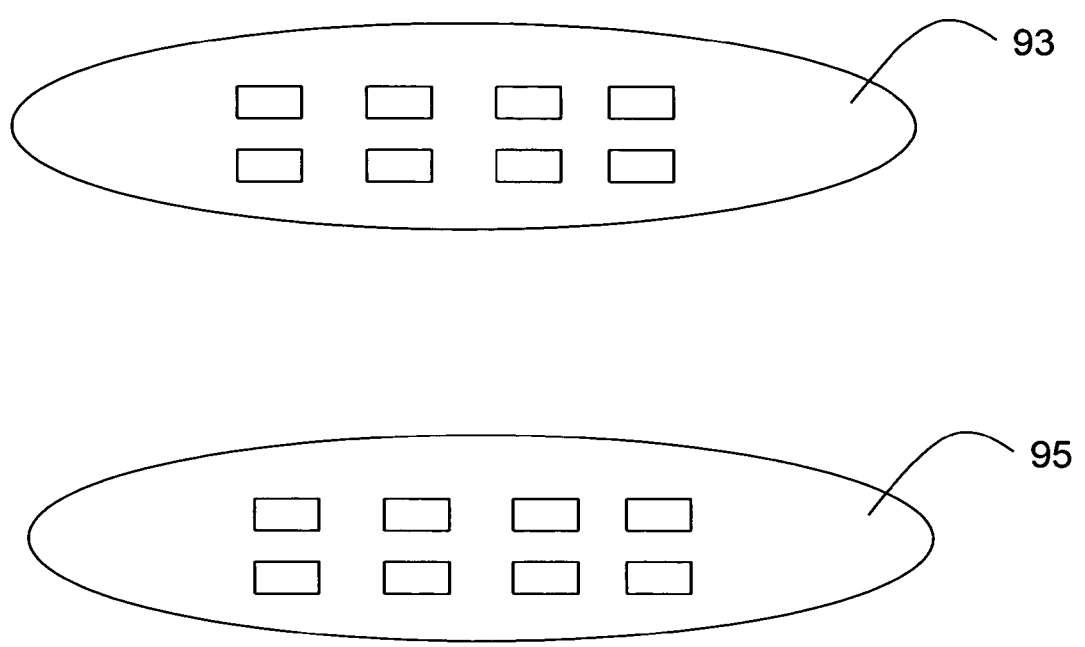
FIG. 9 is a schematic diagram of a LMLC configured as a programmable mask in accordance with the principles of the present invention.

One very important application of the LMLCs, which has been sought after for some time, is a programmable mask. A programmable mask may be used in conventional semiconductor wafer processing to etch structures and devices. In this embodiment, as shown in FIG. 9, an array of LMLCs may be formed, for example, in the shape of a wafer to be used in a mask in lithography. In FIG. 9, wafer mask 93 and 95 are aligned vertically. The second array 95 for the LMLCs positioned in the initial state opposite the first array, is provided. By applying light to selected LMLCs, any desired pattern may be formed.

Each LMLC based pixel of the array generally may include an LMLC attached to a suitable mask structure (for e.g., A1), referred to as a "light movable half pixel". The light movable half pixel may be moved between a first position and a second position. When two arrays of such light movable half pixels are registered appropriately, the mask may be configured for desired complex pattern etching over any conventional wafer. Numerous conventional semiconductor fabrication methods may be used to further customize the fabrication process.

While preferred embodiments have been shown and described, various modifications and substitutions may be made thereto without departing from the spirit and scope of the invention. Accordingly, it is to be understood that the present invention has been described by way of illustrations and not limitation.

The invention claimed is:

1. A switching device actuatable with a light source for transmitting an optical signal therethrough, said switching device comprising:
   a light movable liquid crystal ("LMLC") positionable between a first position and a second position,
   wherein said LMLC is configured for mechanical actuation upon activation with said light source.

2. The switching device of claim 1, wherein said light source is a laser.

3. The switching device of claim 2, wherein said laser is an eximer laser.

4. The switching device of claim 2, wherein said laser is a free electron laser.

5. The switching device of claim 2, wherein said laser is a dye laser.

6. The switching device of claim 1, further comprising: a viscous fluid for supporting said LMLC.

7. The switching device of claim 1, wherein said switching device is an electronic switch device further comprising a voltage source in electrical contact with a conductor when the LMLC is in the first position, whereupon positioning of the LMLC to the second position removes or substantially removes the electrical contact with a conductor on or integral with the LMLC when the LMLC is in the first position.

8. The switching device of claim 1, wherein said switching device is a flip-flop.

9. The switching device of claim 1, wherein said switching device is a reflector.

10. The switching device of claim 1, wherein said switching device is a polarizer.

11. The switching device of claim 1, wherein said switching device is an optical filter.

12. The switching device of claim 1, wherein said switching device is an optical phase shifter.

13. The switching device of claim 1, wherein said switching device is an optical tuner.

14. A switching device actuatable with a light source for transmitting an optical signal therethrough, said switch device comprising:

a light movable liquid crystal ("LMLC") rotatable between a first position and a second position, wherein said LMLC is configured for mechanical rotation upon activation with said light source at an angular moment.

15. The switching device of claim 14, wherein said light source is a laser.

16. The switching device of claim 15, wherein said laser is an eximer laser.

17. The switching device of claim 15, wherein said laser is a free electron laser.

18. The switching device of claim 15, wherein said laser is a dye laser.

19. The switching device of claim 14, further comprising: a viscous fluid for supporting said LMLC.

* * * * *